(12) United States Patent
Hendriks

(10) Patent No.: US 12,202,542 B2
(45) Date of Patent: Jan. 21, 2025

(54) CHASSIS ASSEMBLY FOR A VEHICLE

(71) Applicant: VOLVO TRUCK CORPORATION, Gothenburg (SE)

(72) Inventor: Jan Hendriks, Västra Frölunda (SE)

(73) Assignee: VOLVO TRUCK CORPORATION, Gothenburg (CH)

( * ) Notice: Subject to any disclaimer, the term of this patent is extended or adjusted under 35 U.S.C. 154(b) by 309 days.

(21) Appl. No.: 17/807,553

(22) Filed: Jun. 17, 2022

(65) Prior Publication Data
US 2023/0001986 A1    Jan. 5, 2023

(30) Foreign Application Priority Data
Jun. 30, 2021 (EP) .................................. 21182776

(51) Int. Cl.
*B62D 21/15*    (2006.01)
*B60K 1/04*    (2019.01)
(Continued)

(52) U.S. Cl.
CPC .............. *B62D 21/152* (2013.01); *B60K 1/04* (2013.01); *B60K 15/067* (2013.01); *B62D 21/11* (2013.01);
(Continued)

(58) Field of Classification Search
CPC ........ B62D 21/152; B62D 21/11; B60K 1/04; B60K 15/067
See application file for complete search history.

(56) References Cited

U.S. PATENT DOCUMENTS 10,589,788 B1    3/2020    Milton et al.
11,794,562 B2 *  10/2023   Hendriks ................. B60K 1/00
(Continued)

FOREIGN PATENT DOCUMENTS

CN    205345034 U    6/2016
CN    114348113 A *  4/2022
(Continued)

OTHER PUBLICATIONS

Extended European Search Report in corresponding European Application No. 21182776.1 dated Dec. 14, 2021 (12 pages).
(Continued)

*Primary Examiner* — Faye M Fleming
(74) *Attorney, Agent, or Firm* — Venable LLP; Jeffri A. Kaminski

(57) ABSTRACT

A chassis assembly for a vehicle is provided. The chassis assembly includes: an upper frame structure having at least two longitudinally extending upper side regions arranged on opposite sides of a longitudinal centre line. The upper side regions are connected to each other by upper connection portions. A front crash structure is configured to absorb energy during an impact generated from a vehicle collision, and extends in a transverse direction. The upper frame structure is connected to said front crash structure; wherein said chassis assembly further comprises: a lower frame structure having at least two longitudinally extending lower beams arranged on opposite sides of the longitudinal centre line, said lower beams being connected to each other by lower connection portions, and said lower frame structure is connected to said upper frame structure and to said front crash structure.

13 Claims, 4 Drawing Sheets

(51) Int. Cl.
   *B60K 15/067*   (2006.01)
   *B62D 21/11*    (2006.01)
   *B60K 15/063*   (2006.01)

(52) U.S. Cl.
   CPC .............. *B60K 2001/0416* (2013.01); *B60K 2015/0638* (2013.01)

(56) References Cited

U.S. PATENT DOCUMENTS

| | | |
|---|---|---|
| 2018/0272852 A1 | 9/2018 | Ajisaka |
| 2022/0281306 A1* | 9/2022 | Landvik .................. B62D 21/04 |

FOREIGN PATENT DOCUMENTS

| | | |
|---|---|---|
| DE | 102016113759 A1 | 4/2017 |
| DE | 102017007490 A1 | 2/2019 |
| EP | 0591717 A1 | 4/1994 |
| EP | 3444138 A1 | 2/2019 |
| JP | 2015009583 A | 1/2015 |

OTHER PUBLICATIONS

European Communication Pursuant to Article 94(3) dated Oct. 16, 2023 in corresponding European Patent Application No. 21182776.1, 10 pages.

* cited by examiner

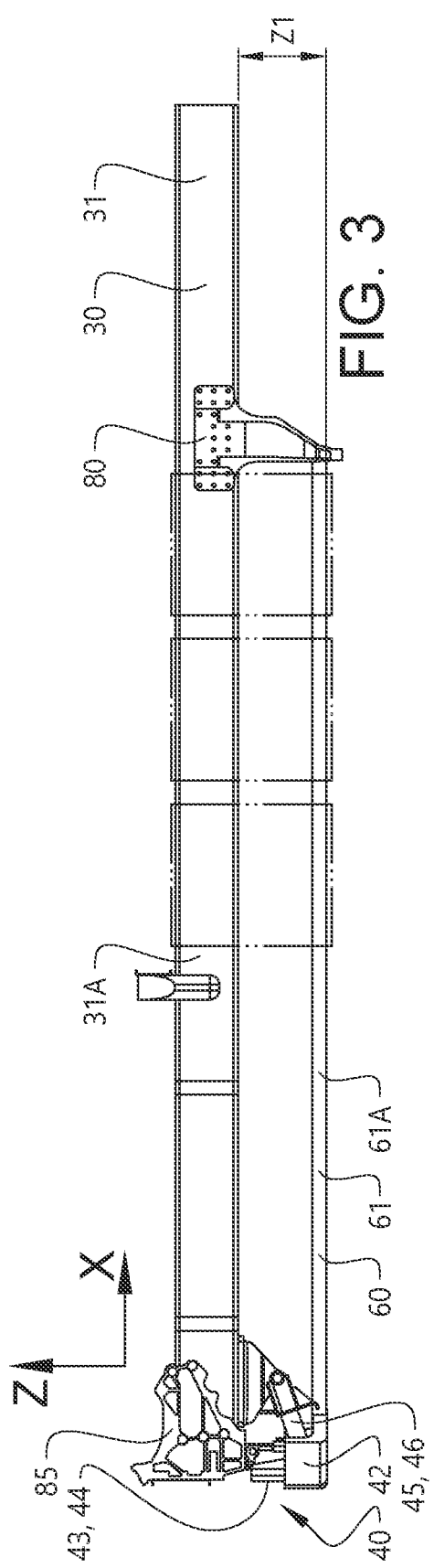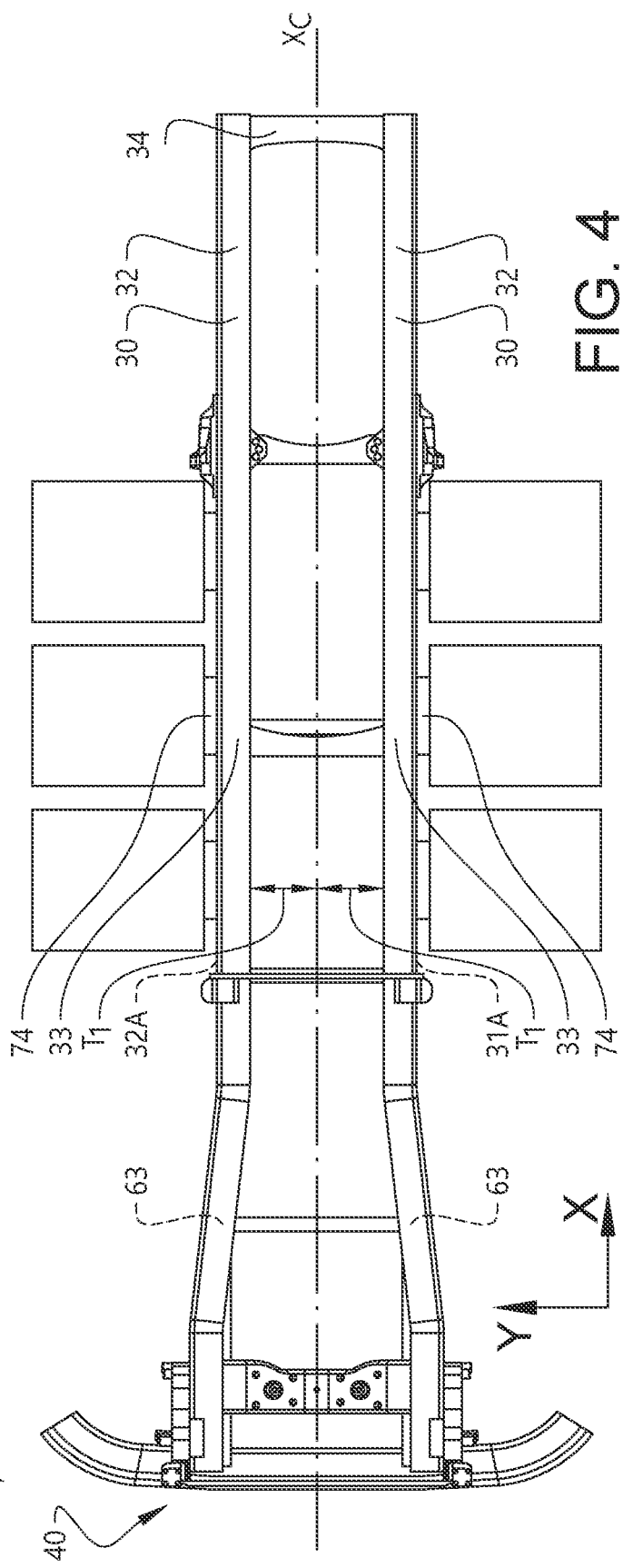

CHASSIS ASSEMBLY FOR A VEHICLE

TECHNICAL FIELD

The present invention relates to a chassis assembly for a vehicle. The invention also relates to a vehicle comprising such a chassis assembly. The chassis assembly is applicable on vehicles, in particularly trucks which are propelled by electric machines. Although the invention will mainly be described in relation to a truck, it may also be applicable for other types of vehicles propelled by electric machines.

BACKGROUND

In order to meet the increasing demands on vehicles, in particular the demands on heavy-duty trucks to provide more sustainable and low-emission based propulsions systems, there is a continuous development within a number of different fields relating to components and structures making up the chassis and the frames of the vehicle.

By way of example, a conventional manufacturing and assembly process of a truck vehicle is based around a chassis structure of having two longitudinally extending beams with cross sections in the form of C-profiles. These longitudinally extending beams are generally connected to each other by a suitable number of cross-members. In addition, the prime mover and gearbox are generally arranged in the front of the chassis, while essentially all other components are attached to the longitudinally extending beams.

However, with the introduction of new energy storage systems, such as batteries and fuel cells, there has been an increasing activity for developing new frame structures and chassis assemblies so as to provide adequate space for sufficiently large batteries. Hence, one area of particular interest in heavy-duty vehicles is the arrangement of the energy storage system to the chassis assembly. Typically, the battery connected to the electric machine propelling the vehicle needs to be relatively large to be able to deliver a substantial amount of electric power to the electric machine (s), in particular when aiming for covering a long driving range without having to charge the battery.

In addition to providing sufficient space for the energy storage system, the chassis assembly and the associated frame structures of heavy-duty vehicles need to be developed in order to handle forces that may be generated during a frontal vehicle crash. In fact, there is not only a need for mitigating the forces generated by the actual collision, but also a need for handling any movement of the high mass of the batteries on the vehicles.

There is thus a desire to improve the chassis and its associated frame structure of a vehicle, in particular for heavy-duty vehicles including one or more energy storage systems.

SUMMARY

It is an object of the present invention to provide a chassis assembly for a vehicle that at least partly overcomes the above-described deficiencies.

According to a first aspect, there is provided a chassis assembly for a vehicle. The chassis assembly has a longitudinal centre line and extends in a transverse direction and in a vertical direction. The chassis assembly comprises an upper frame structure having at least two longitudinally extending upper side regions arranged on opposite sides of the longitudinal centre line. The upper side regions are connected to each other by upper connection portions. The chassis assembly further comprises a front crash structure configured to absorb energy during an impact generated from a vehicle collision. The front crash structure extends in the transverse direction. The upper frame structure is connected to the front crash structure. Moreover, the chassis assembly further comprises a lower frame structure having at least two longitudinally extending lower beams arranged on opposite sides of the longitudinal centre line. The lower beams are connected to each other by lower connection portions. Further, the lower frame structure is connected to the upper frame structure and to the front crash structure.

By the configuration of the chassis assembly, there is provided an improved reinforcement structure so as to better handle loads generated from a frontal crash. The proposed chassis assembly also contributes to an improved impact protection for an energy storage system, ESS, such as a battery pack, which is at least partly supported by the components making up the chassis assembly of the vehicle.

The chassis assembly is particularly useful for heavy-duty vehicles containing energy storage systems, such as batteries.

In addition, the chassis assembly provides for a more cost-efficient and weight-effective chassis reinforcement, without negatively impacting the main frame structure of the vehicle, such as the upper frame structure of the chassis assembly.

Further, the chassis assembly contributes to an improved load path for forces generated from a frontal crash in that the front crash structure may be further joined to one or more suspended ESS units and an optimal rear suspension part, as further described herein.

In other words, by the configuration of the chassis assembly, it becomes possible to improve the force distribution in the front of the vehicle during a frontal crash. That is, by providing an arrangement in which the lower frame structure is connected to the upper frame structure and to the front crash structure, it becomes possible to avoid, or at least reduce frame bending/deformation, while reducing risk of transferring critical forces into any support arrangements for the batteries, such as battery support brackets. To this end, it become possible to provide a robust, yet simple and weight-effective chassis assembly for a vehicle.

Further, by the arrangement of having the lower frame structure connected both to the upper frame structure and to the front crash structure, it becomes possible to provide a separate impact protection in the form of the longitudinally extending lower beams for an ESS, such as a battery pack, that is supported by the upper and lower longitudinally extending frame portions.

By the arrangement of the upper and lower frame structures, the chassis assembly is adapted to be a load bearing frame arrangement, in which the components making up the upper and lower frame structures may generally increase the stiffness of the load bearing frame arrangement. As such, the chassis assembly can also absorb the load generated by heavy-duty vehicle batteries connected to the frame structures.

One advantage with connecting the longitudinally extending lower beams to each other by the lower connection portions, is that the load paths during a collision is further improved. Typically, a frontal collision with another vehicle may also result in that the impact from the collision is absorbed by the chassis assembly slightly offset from the longitudinal center line of the vehicle. The provision of connecting the longitudinally extending lower beams to each other by the lower connection portions may contribute to an overall stiffer structure, thus may also further improve the chassis assembly for handling such frontal collision with another vehicle.

It is to be noted that the lower frame structure is arranged vertically spaced apart from the upper frame structure by a distance.

According to an example embodiment, the longitudinally extending upper side regions are provided in the form of longitudinally extending upper beams, respectively. In this manner, there is proved a simple, yet stiff and robust chassis assembly.

Typically, the chassis assembly may further comprise an energy storage system, ESS, adapted to store at least one ESS unit so that the ESS unit is supported by one of the longitudinally extending upper beams and one of the longitudinally extending lower beams.

By way of example, the ESS unit is a battery unit, the battery unit is supported by one of the longitudinally extending upper beams and one of the longitudinally extending lower beams.

In addition, or alternatively, at least one of the ESS unit may be any one of a hydrogen tank and diesel tank. Hence, by way of example, the ESS unit may be any one of a hydrogen tank and diesel tank.

According to an example embodiment, the ESS is adapted to store the at least one ESS unit on at least one of the transverse outsides of the upper frame structure and the lower frame structure. One advantage with providing an assembly where e.g. larger batteries can be arranged on the transverse outsides of the upper frame structure and the lower frame structure is that more space for the batteries is created compared to more conventional arrangement of batteries, e.g. chassis assemblies where the batteries are arranged in the transverse centre of the vehicle. Hence, another advantage is that the assembly and mounting processes of the batteries to the chassis assembly can be further improved.

According to an example embodiment, the ESS units are arranged to the chassis assembly by a number of interconnecting portions. By way of example, the inter-connecting portions are provided in the form of brackets. The ESS unit brackets may be positioned along the longitudinal extension of the vehicle assembly at a predetermined distance from each other.

According to an example embodiment, a vertical distance between one of the longitudinally extending upper side regions and one corresponding longitudinally extending lower beam is at least 0.3 meters. In this manner, the chassis assembly may be further improved in terms of robustness and effectiveness in handling forces generated during a frontal collision with other objects, such as another vehicle. Typically, although strictly not required, each one of the at least two longitudinally extending lower beams may be connected to the front crash structure. According to an example embodiment, the front crash structure is a collapsible crash structure.

In addition, or alternatively, the front collapsible crash structure may comprise a horizontal profile having at least two vertical support members configured to attach to the upper frame structure and at least two horizontal support members configured to collapse during the vehicle collision. An advantage is that the front crash structure is adapted to deform and/or collapse in a more effective manner.

According to an example embodiment, each one of the at least two longitudinally extending lower beams is connected to the upper frame structure by means of a frame bracket. In this manner, the loads absorbed by the vehicle assembly during a collision is further improved. In addition, there is provided a simple, yet robust way of connecting the lower frame structure to the upper frame structure. By way of example, the frame bracket is a rear frame bracket, wherein each one of the at least two longitudinally extending lower beams is connected to the upper frame structure by means of the rear frame bracket at a rear portion of the chassis assembly. According to an example embodiment, the chassis assembly comprises a number of frame brackets arranged spaced apart along the longitudinal direction of the vehicle assembly. The bracket(s) may also increase the stiffness of the chassis assembly while at the same time serve as connector elements for one or more of the ESS units. Typically, and according to an example embodiment, the frame bracket may be connected to the vehicle assembly and extends transversally away from the longitudinal side regions.

Optionally, each one of the at least two longitudinally extending lower beams may be connected to a rear suspension frame bracket. An advantage is that the weight and costs of the overall chassis assembly may be reduced in comparison to other hitherto known frame structures for heavy-duty vehicles.

According to an example embodiment, the lower frame structure is connected to the upper frame structure at a front region and at a rear region of the chassis assembly. By way of example, the lower frame structure is connected to the upper frame structure at the front region via the front crash structure and at the rear region via the rear suspension frame bracket.

According to an example embodiment, each one of the at least two longitudinally extending upper side regions and the at least two longitudinally extending lower beams is located at a substantially same transversal distance from the longitudinal centre line. Hereby, there is provided a chassis assembly that may allow for a simple, yet reliable connection of other vehicle components to the chassis assembly, which is at least partly due to that the upper and lower frame structures are located in the same plane, or at least relative close to each other as seen in a transverse direction from a centre plane.

According to an example embodiment, each one of the two longitudinally extending upper beams is made of a continuous C-profile beam.

According to an example embodiment, the upper frame structure is a composite sandwich structure continuously extending between the longitudinally extending upper side regions.

According to a second aspect, there is provided a vehicle, comprising a vehicle chassis according to any one of the embodiments described above in relation to the first aspect. By way of example, the vehicle is any one of an electric vehicle and a hybrid vehicle comprising at least an electric powertrain system.

According to an example embodiment, the vehicle may comprise a electric machine for propelling the vehicle, the vehicle further comprises a plurality of vehicle batteries electrically connected to the electric machine, wherein the vehicle batteries are connected to the vehicle assembly transversally outside the sides of the upper and lower frame structures.

Effects and features of the second aspect are largely analogous to those described above in relation to the first aspect.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present disclosure, will be better understood through the following illustrative and non-limiting detailed description of exemplary embodiments, wherein:

FIG. 3 is a side view of the chassis assembly in FIG. 2 according to an example embodiment;

FIG. 4 is a top view of the chassis assembly in FIG. 2 according to an example embodiment.

DETAIL DESCRIPTION OF EXAMPLE EMBODIMENTS OF THE DISCLOSURE

Figure 1:
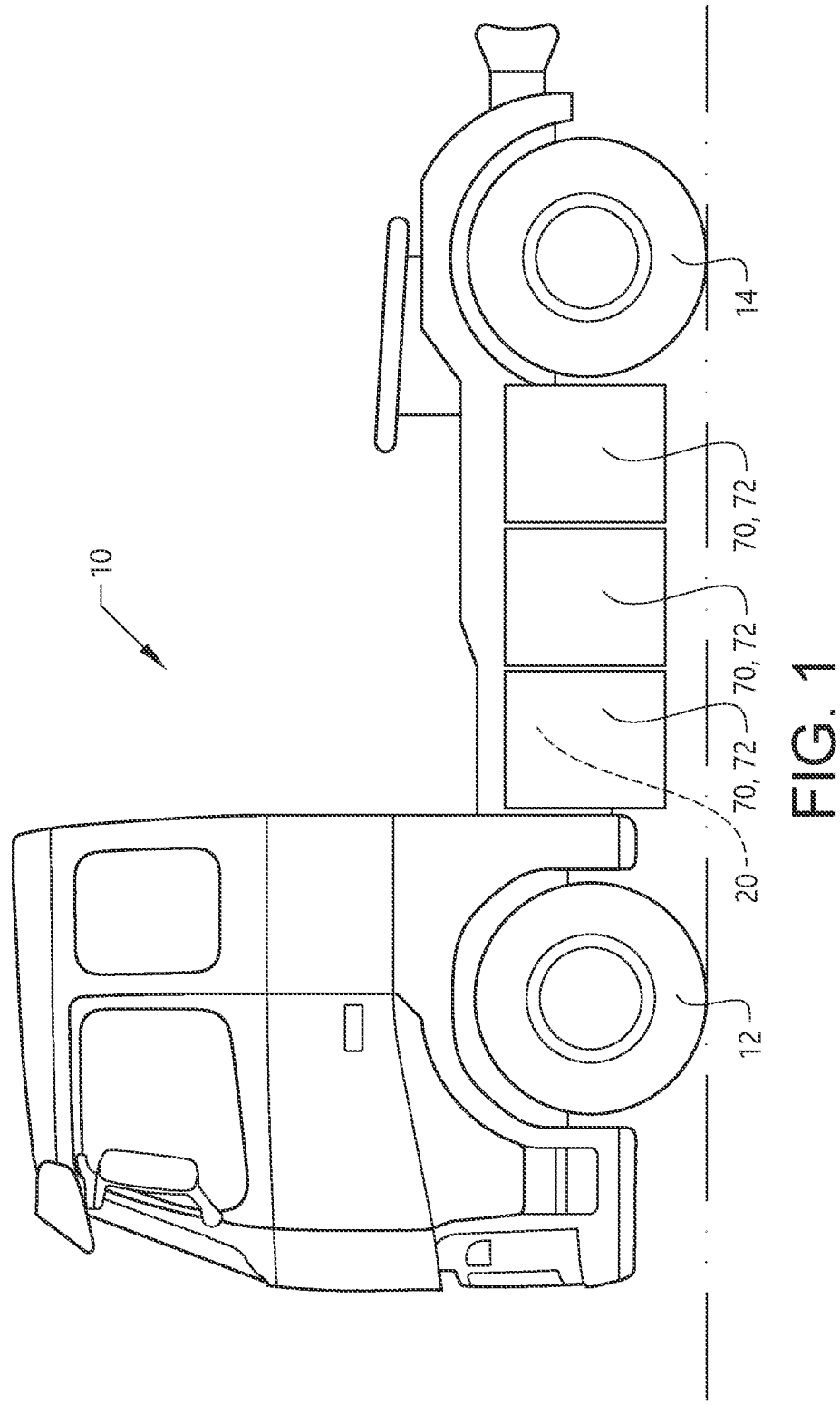
FIG. 1 is a side view of a vehicle according to an example embodiment.

The present disclosure will now be described more fully hereinafter with reference to the accompanying drawings, in which exemplary embodiments are shown. The disclosure may, however, be embodied in many different forms and should not be construed as limited to the embodiments set forth herein; rather, these embodiments are provided for thoroughness and completeness. Like reference character refer to like elements throughout the description.

With initial reference to FIG. 1, there is provided a vehicle 10 in the form of a truck. The vehicle 10 illustrated in FIG. 1 comprises a pair of front wheels 12 and a pair of rear wheels 14. It should however be readily understood that the vehicle 10 may equally as well comprise a first pair of rear wheels and a second pair of rear wheels, where the first pair of wheels is positioned longitudinally in front of the second pair of rear wheels. The second pair of rear wheels may be connected to a so-called tag-axle and the first pair of rear wheels may be connected to a so-called pusher axle.

The vehicle 10 further comprises a chassis assembly 20, as indicated in FIG. 1, and schematically illustrated in FIGS. 2 to 5. The chassis assembly 20 has a longitudinal centre line $X_c$. The chassis assembly 20 has an extension in the longitudinal direction X. Moreover, the chassis assembly has an extension in a transverse direction Y and in a vertical direction Z. It should be noted that the terms top, above, upper, upward, below, lower, downward and bottom, as well as any other similar terms are used in reference to the position of the vehicle assembly 20 as depicted in the drawings and the vehicle assembly may be positioned and used in other orientations. In other words, also terms such as front, rear, side, and any other similar terms refers to the directions and orientations as depicted in the drawings and the vehicle assembly may be positioned and used in other orientations. The chassis assembly 20 is generally intended and configured to provide a load bearing support to the vehicle.

Figure 2:
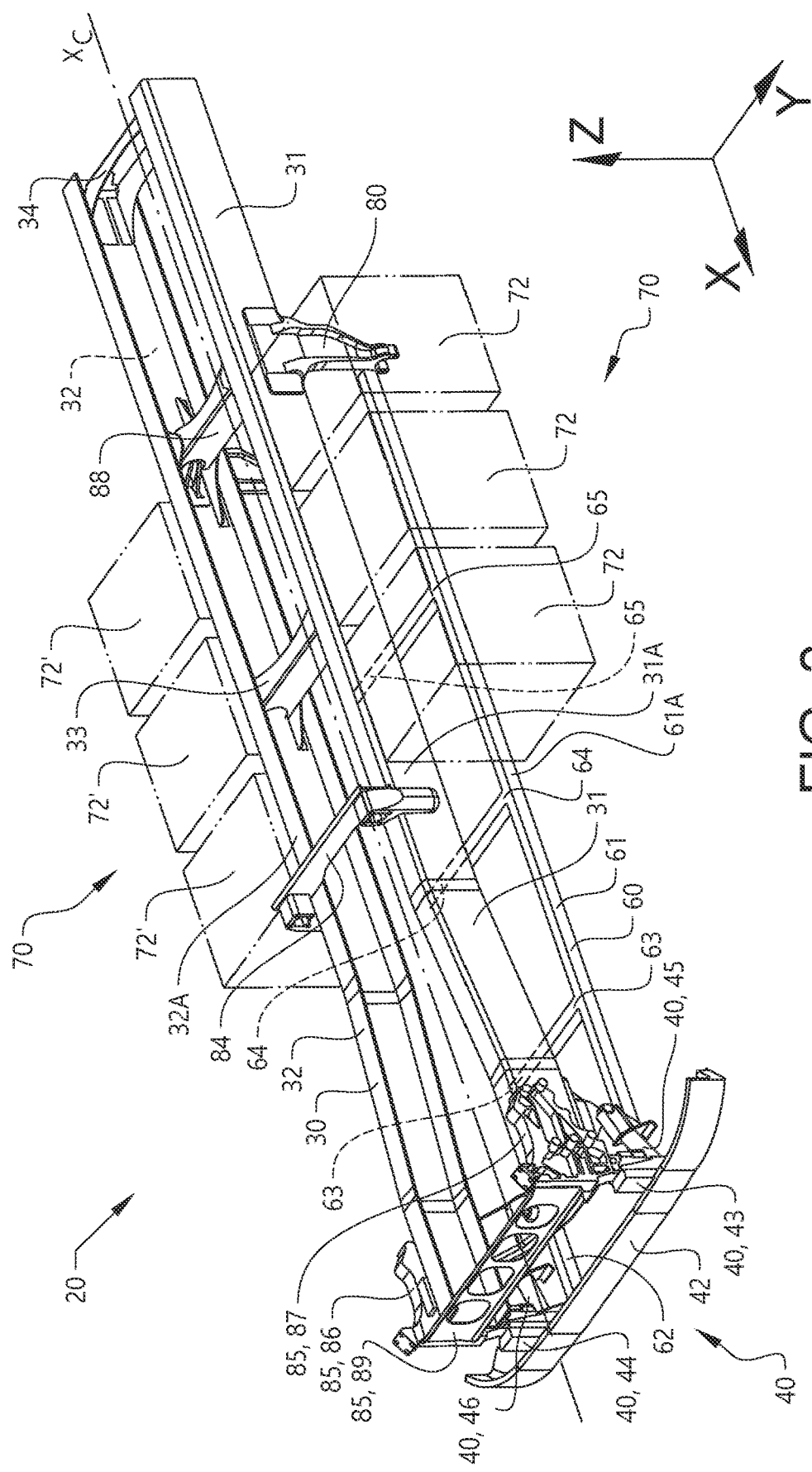
FIG. 2 is a perspective view of a chassis assembly according to an example embodiment.

Turning now to e.g. FIG. 2, the chassis assembly 20 comprises an upper frame structure 30 comprising at least two longitudinally extending upper side regions 31, 32 arranged on opposite sides of the longitudinal centre line $X_c$. The upper side regions are connected to each other by upper connection portions 33, 34, 84, 85, 88 as illustrated in FIGS. 2 to 5. By way of example, the longitudinally extending upper side regions 31, 32 are provided in the form of longitudinally extending upper beams, respectively, as illustrated in FIGS. 2 to 5. Hence, the vehicle assembly here comprises two longitudinally extending upper beams 31, 32. The longitudinally extending upper beams 31, 32 are connected to each other by a number of upper connection portions 33, 34, 84, 85, 88. By way of example, the upper connection portions 33, 34, 84, 85, 88 are provided in the form of transverse cross-members. The transverse cross-members are connected to the longitudinally extending upper beams in a suitable manner, e.g. in the form of fastening elements to form connection portions. The fastening elements can, for example, be formed by screw joints, bolts, rivets, welds, etc. or any other suitable fasteners for connecting components to the each other. The transverse cross-members can be provided in several different manners. By way of example, the cross-members can extend in-between the longitudinally extending upper beams so as to connect them to each other. Examples of such cross-members are the cross-member 33, 34, 88. In addition, or alternatively, the cross-members can extend between the upper beams and be arranged vertically above the longitudinally extending upper beams 31, 32 so as to connect them to each other. One example of such cross-member is the cross-member 84. Another type of cross-member is the front closing structure 85. The front closing structure 85 is arranged at the front of the chassis assembly 20, thus at the front of the upper frame structure 30. The front closing structure 85 is arranged to close the front gap defined by the longitudinally extending upper beams 31, 32 so as to provide further stability to the chassis assembly. In this example, the front closing structure 85 comprises two side brackets 86, 87 and a front plate 89. The front plate extends in the transverse direction Y between the longitudinally extending upper beams 31, 32. The side brackets 86, 87 are connected to the front plate 89 and further connected to the longitudinally extending upper beams 31, 32. The side bracket 87 is connected to the upper beam 31, while the side bracket 86 is connected to the upper beam 32. Moreover, the front closing structure 85 is adapted to provide an interface to a cab of the vehicle, as is commonly known in the art of chassis assemblies and front closing structures.

In addition, each one of the two longitudinally extending upper beams 31, 32 is here made of a corresponding continuous C-profile beam. Each one of the beams may be provided in the form of a steel C-profile beam or any other suitable material as is commonly used in frame structures of chassis assemblies. In other examples (not shown), the upper frame structure may be a composite sandwich structure continuously extending between the longitudinally extending upper side regions.

As illustrated in e.g. FIG. 2, the chassis assembly 20 also comprises a front crash structure 40. The front crash structure 40 is configured to absorb energy during an impact generated from a vehicle collision. The front crash structure 40 extends in the transverse direction Y. The front crash structure 40 is here a collapsible crash structure. The front collapsible crash structure comprises a horizontal profile 42 having at least two vertical support members 43, 44 configured to attach to the upper frame structure 30 and at least two horizontal support members 45, 46 configured to collapse during the vehicle collision. In this context, the term horizontal generally means that the components have at least a substantial orientation in alignment with the longitudinal direction X, as illustrated in e.g. FIG. 3. The horizontal support members 45, 46 are here made by a deformable material and/or with a deformable structure, e.g. a standard steel profile shaped to provide a defined deformation. The profile may have a circular or rectangular cross-section profile. Hence, the horizontal support members are horizontal deformation support members 45, 46.

Accordingly, and as illustrated in FIGS. 2 to 5, the upper frame structure 30 is connected to the front crash structure 40. In the example as illustrated in FIGS. 2 to 5, each one of the longitudinally extending upper beams 31, 32 is connected to the front crash structure 40. By way of example, the upper frame structure 30 is connected to the horizontal profile 42 via the two vertical support members 43, 44, as illustrated in FIG. 2. As such, each one of the longitudinally extending lower beams 31, 32 is connected to transverse sides of the front crash structure 40, respectively. The longitudinally extending lower beam 31 is connected to the vertical support member 43, while the longitudinally extending lower beam 32 is connected to the vertical support member 44. In this example, the upper frame structure 30 is also at least partly connected to the two vertical support members 43, 44 via the front closing structure 85. It may be possible that the upper frame structure 30 is directly connected to the front crash structure 40 or that the upper frame structure 30 is connected to the front crash structure 40 via the front closing structure 85.

Figure 5:
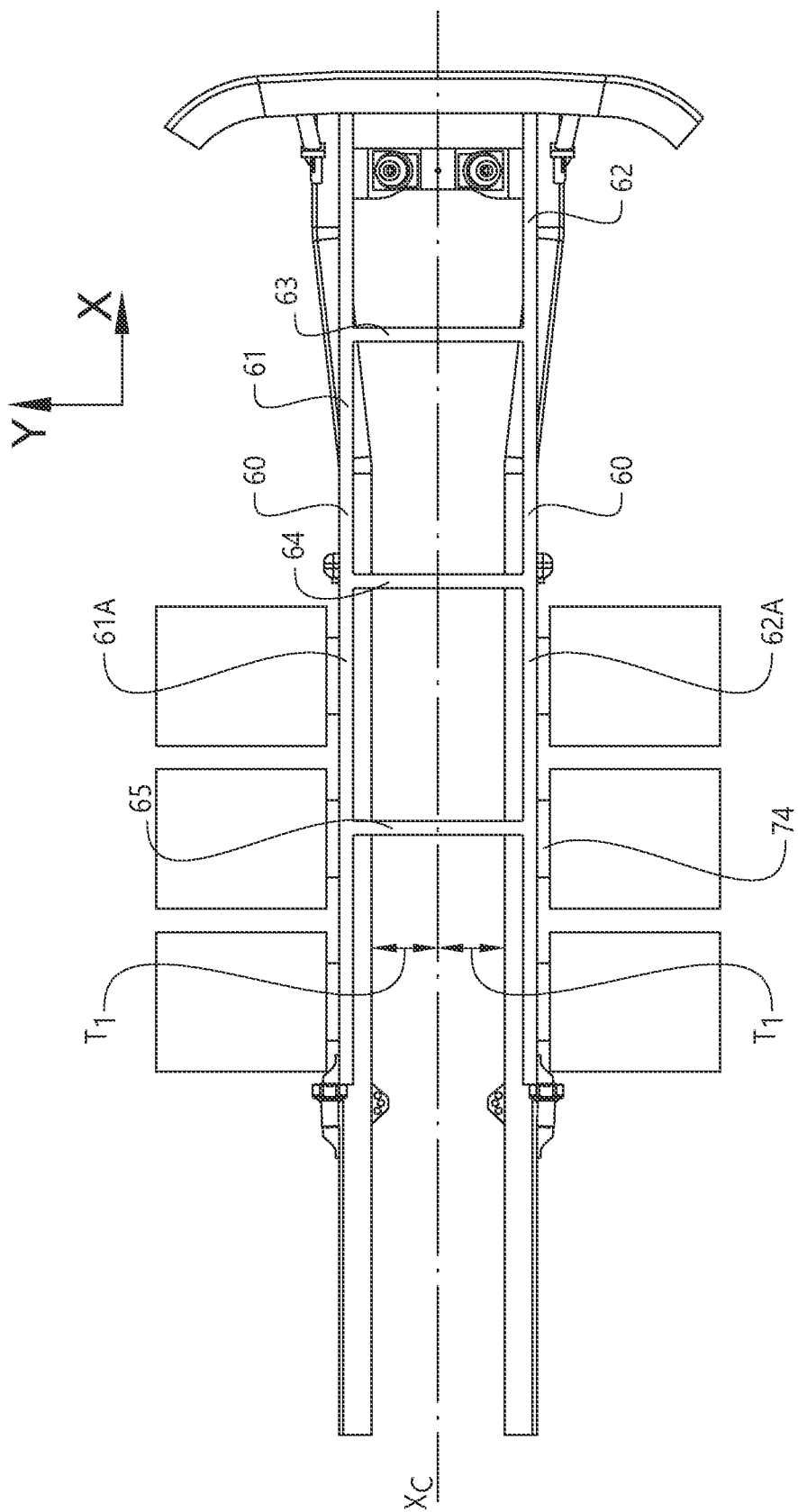
FIG. 5 is a bottom view of the chassis assembly in FIG. 2 according to an example embodiment.

In addition, the chassis assembly 20 further comprises a lower frame structure 60 having at least two longitudinally extending lower beams 61, 62 arranged on opposite sides of the longitudinal centre line $X_c$. The lower frame structure 60 is at least partly illustrated in all FIGS. 2 to 5, while the bottom view of the chassis assembly 20 in FIG. 5 depicts additional parts of the lower frame structure 60. As may be gleaned from FIG. 5, the lower beams 61, 62 are connected to each other by lower connection portions 63, 64, 65. By way of example, the lower connection portions 63, 64, 65 are provided in the form of transverse cross-members. The transverse cross-members are connected to the lower beams 61, 62 in a suitable manner, e.g. in the form of fastening elements to form connection portions. The fastening elements can, for example, be formed by screw joints, bolts, rivets, welds, etc. or any other suitable fastener for connecting components to the each other. The lower beams 61, 62 are here also made of corresponding continuous C-profile beams. Each one of the beams may be provided in the form of a steel C-profile beam or any other suitable material as is commonly used in frame structures of chassis assemblies. Another example of a suitable material is aluminium extruded closed profiles.

The lower frame structure 60 is connected to the upper frame structure 30 and to the front crash structure 40, as illustrated in FIGS. 2 and 3. The lower frame structure is connected to the upper frame structure with a vertical distance therebetween. Hence, the lower frame structure 60 is vertically spaced apart from the upper frame structure 30.

Typically, the lower frame structure 60 is connected to the upper frame structure 30 and to the front crash structure 40 by a number of fastening elements to form additional connection portions or connection points between these components. By way of example, the lower frame structure 30 is connected to the horizontal profile 42 of the front crash structure 40, as illustrated in FIG. 3. Accordingly, each one of the two longitudinally extending lower beams 61, 62 is connected to the upper frame structure 30 via the front crash structure 40.

In addition, as illustrated in FIG. 3, the lower frame structure 60 is here connected to the upper frame structure 30 by a frame bracket 80. By way of example, each one of the at least two longitudinally extending lower beams 61, 62 is connected to the upper frame structure 30 by means of the frame bracket 80. The frame bracket extends on opposite transverse sides of the upper frame structure and connect to the two longitudinally extending upper beams 31, 32. In other words, the two longitudinally extending lower beams 61, 62 are connected to the two longitudinally extending upper beams 31, 32 by the frame bracket, respectively.

In this example the frame bracket 80 is a suspension frame bracket, in particular a rear suspension frame bracket. Hence, as illustrated in e.g. FIG. 2, each one of the at least two longitudinally extending lower beams 61, 62 is connected to the rear suspension frame bracket 80. The rear suspension frame bracket 88 is further connected to the upper frame structure 30, e.g. to the two longitudinally extending upper side regions 31, 32.

Further, as illustrated in FIG. 3, the lower frame structure 60 is here connected to the upper frame structure 30 and to the front closing structure 85. The front crash structure 40 may also be connected to the front closing structure 85. Hence, the lower frame structure 60 is connected to the upper frame structure 30 via the front crash structure 40 and the front closing structure 85.

To this end, the lower frame structure 60 is connected to the upper frame structure 30 at the front via the front crash structure 40 and at the rear region via the rear suspension frame bracket 80.

As illustrated in FIGS. 2 to 5, the two longitudinally extending upper side regions 31, 32 are positioned at a transversal distance from each other. Analogously, the two longitudinally extending lower beams 61, 62 are positioned at a transversal distance from each other. Optionally, although strictly not required, each one of the two longitudinally extending upper side regions 31, 32 and the two longitudinally extending lower beams 61, 62 is located at a substantially same transversal distance Y1 from the longitudinal centre line XC, as illustrated in FIGS. 4 and 5. In other words, the longitudinally extending upper beam 31 is arranged by a transversal distance Y1 from the longitudinal centre line XC, the longitudinally extending upper beam 32 is arranged by a transversal distance Y1 from the longitudinal centre line XC, the longitudinally extending lower beam 61 is arranged by a transversal distance Y1 from the longitudinal centre line XC, and the longitudinally extending lower beam 62 is arranged by a transversal distance Y1 from the longitudinal centre line XC.

Turning again to the vehicle in FIG. 1, the vehicle 10 is generally an electric vehicle comprising at least an electric powertrain system (not shown). As such, the vehicle 10 here comprises an energy storage system, ESS, 70. Typically, the chassis assembly comprises the ESS 70. As further illustrated in FIGS. 2 to 5, the ESS, 70 is adapted to store at least one ESS unit 72, 72' so that the ESS unit 72, 72' is supported by one of the longitudinally extending upper beams and one of the longitudinally extending lower beams. Accordingly, the ESS 70 comprises a plurality of ESS units 72, 72'.

In FIGS. 2 to 5, each one of the ESS units 72, 72' is a battery unit. Thus, each one of the battery units is supported by one of the longitudinally extending upper beams and one of the longitudinally extending lower beams, respectively. In other examples, the ESS unit may be any one of a hydrogen tank and diesel tank.

The ESS units 72, 72' are arranged to supply power for propelling an electric machine (not shown) of the vehicle 10. The vehicle 10 is thus operated using at least one electric machine, which can be arranged in the form of wheel hub motors or a single electric motor connected to e.g. the pair of front wheels. The ESS units 72, 72' may thus form a plurality of vehicle batteries for supplying electrical power to the electric machine. The ESS units 72, 72' may on the other hand, as an alternative, form a plurality of hydrogen tanks comprising hydrogen fuel which is supplied to a fuel cell system that generates electric power to be supplied to a battery or directly to the electric machine.

In the example illustrated in FIGS. 2 to 5, the ESS units 72 are supported by the longitudinally extending upper beam 31 and the longitudinally extending lower beam 61. Analogously, the ESS units 72' are supported by the longitudinally extending upper beam 32 and the longitudinally extending lower beam 62. More specifically, the ESS 70 is adapted to store the ESS units 72, 72' on transverse outsides 31a, 32a, 61a, 62a of the upper frame structure 30 and the lower frame structure 60. As such, the ESS units 72 are arranged to the transverse outside 31a of the longitudinally extending upper beam 31 and the transverse outside 61a of the longitudinally extending lower beam 61. Analogously, the ESS units 72' are arranged to the transverse outside 32a of the longitudinally extending upper beam 32 and the transverse outside 62a of the longitudinally extending lower beam 62.

Further, as illustrated in e.g. FIG. 4, the ESS units 72, 72' are connected to the respective beams by e.g. interconnecting portions 74, 74' arranged to connect the ESS units 74. 74' to the sides of transverse sides of the respective beams. The interconnecting portions 74, 74' may e.g. be brackets positioned along the longitudinal extension of the vehicle assembly 20 at a predetermined distance from each other. By way of example, the interconnecting bracket portions 74, 74' are attached to the longitudinally extending upper beams and the longitudinally extending lower beams, respectively, as illustrated in e.g. FIGS. 4 and 5. The interconnecting bracket portions 74, 74' are attached to the longitudinally extending upper beams and the longitudinally extending lower beams, respectively, by a predetermined longitudinal distance between each other. Moreover, the ESS units 72, 72' are attached to the interconnecting bracket portions 74, 74'. Alternatively, the ESS unit 72, 72' comprise corresponding interconnecting bracket portions 74, 74' for attachment to the longitudinally extending upper beams and the longitudinally extending lower beams.

By way of example, a vertical distance Z1 between one of the longitudinally extending upper side regions and one corresponding longitudinally extending lower beam is at least 0.3 meters. By way of example, the vertical distance Z1 between the longitudinally extending upper side region 31 and the longitudinally extending lower beam is at least 0.3 meters.

Although not specifically illustrated in the FIGS. 2 to 5, the chassis assembly 20 may also include additional components. By way of example, the chassis assembly 20 may comprise a front wheel suspension arrangement and a rear wheel suspension arrangement. The front and rear wheel suspension arrangements are not depicted in FIG. 1 but should be understood to suspend the pair of front wheels and pair of rear wheels, respectively.

It is to be understood that the present disclosure is not limited to the embodiments described above and illustrated in the drawings; rather, the skilled person will recognize that many changes and modifications may be made within the scope of the appended claims.

The invention claimed is:

1. A chassis assembly for a vehicle, said chassis assembly having a longitudinal center line, and extending in a transverse direction and a vertical direction, said chassis assembly comprising:

an upper frame structure having at least two longitudinally extending upper side regions arranged on opposite sides of the longitudinal center line, said upper side regions being connected to each other by upper connection portions;

a front crash structure configured to absorb energy during an impact generated from a vehicle collision, said front crash structure extending in the transverse direction;

said upper frame structure being connected to said front crash structure;

wherein said chassis assembly further comprises:

a lower frame structure having at least two longitudinally extending lower beams arranged on opposite sides of the longitudinal center line, said lower beams being connected to each other by lower connection portions, wherein said lower frame structure is connected to said upper frame structure and to said front crash structure; and an energy storage system, ESS, adapted to store at least one ESS unit so that said ESS unit is supported by one of said longitudinally extending upper beams and one of said longitudinally extending lower beams, wherein the ESS is adapted to store the at least one ESS unit on at least one of the transverse outsides of the upper frame structure and the lower frame structure.

2. The chassis assembly according to claim 1, wherein the longitudinally extending upper side regions are provided in the form of longitudinally extending upper beams, respectively.

3. The chassis assembly according to claim 1, wherein the ESS unit is a battery unit, said battery unit being supported by one of said longitudinally extending upper beams and one of said longitudinally extending lower beams.

4. The chassis assembly according to claim 1, wherein the ESS unit is any one of a hydrogen tank and diesel tank.

5. The chassis assembly according to claim 1, wherein a vertical distance between one of the longitudinally extending upper side regions and one corresponding longitudinally extending lower beam is at least 0.3 meters.

6. The chassis assembly according to claim 1, wherein each one of said at least two longitudinally extending lower beams is connected to said front crash structure.

7. The chassis assembly according to claim 1, wherein the front crash structure is a collapsible crash structure.

8. The chassis assembly according to claim 7, wherein the front collapsible crash structure comprises a horizontal profile having at least two vertical support members configured to attach to the upper frame structure and at least two horizontal support members configured to collapse during the vehicle collision.

9. The chassis assembly according to claim 1, wherein each one of said at least two longitudinally extending lower beams is connected to the upper frame structure by means of a frame bracket.

10. The chassis assembly according to claim 1, wherein each one of said at least two longitudinally extending lower beams is connected to a rear suspension frame bracket.

11. The chassis assembly according to claim 1, wherein each one of said at least two longitudinally extending upper side regions and said at least two longitudinally extending lower beams is located at a substantially same transversal distance from said longitudinal center line.

12. The chassis assembly according to claim 1, wherein the upper frame structure is a composite sandwich structure continuously extending between said longitudinally extending upper side regions.

13. A vehicle comprising a vehicle chassis according to claim 1.

* * * * *